US012744840B2

(12) United States Patent
Shi

(10) Patent No.: US 12,744,840 B2
(45) Date of Patent: Sep. 22, 2026

(54) ELECTRONIC DEVICE AND FABRICATION METHOD THEREOF

(71) Applicant: Lenovo (Beijing) Limited, Beijing (CN)

(72) Inventor: Wenbo Shi, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 503 days.

(21) Appl. No.: 18/168,159

(22) Filed: Feb. 13, 2023

(65) Prior Publication Data

US 2023/0262153 A1 Aug. 17, 2023

(30) Foreign Application Priority Data

Feb. 14, 2022 (CN) ......................... 202210132943.4

(51) Int. Cl.
*H04M 1/02* (2006.01)

(52) U.S. Cl.
CPC ................................ *H04M 1/0283* (2013.01)

(58) Field of Classification Search
CPC ........ H04M 1/0283; H04M 1/026; G06F 1/16
See application file for complete search history.

(56) References Cited

U.S. PATENT DOCUMENTS

2007/0135188 A1* 6/2007 Watanabe ........... H04M 1/0214 455/575.3
2018/0016661 A1* 1/2018 Stevick ................... C22C 45/08
2020/0189973 A1* 6/2020 Tatebe ..................... C03C 3/083
2021/0348294 A1* 11/2021 Feinberg ............... G06F 1/1626
2024/0158943 A1* 5/2024 Guo ....................... C25D 11/16

FOREIGN PATENT DOCUMENTS

CN 104439927 A 3/2015
CN 104972283 A 10/2015
CN 105642749 A * 6/2016 ........... B21D 35/005

* cited by examiner

*Primary Examiner* — Charles N Appiah
(74) *Attorney, Agent, or Firm* — ANOVA LAW GROUP, PLLC

(57) ABSTRACT

An electronic device includes an integrally formed metal casing including a first part and a second part that are intersecting with each other. An outer surface of the first part is a first surface presenting a first visual effect. An outer surface of the second part is a second surface presenting a second visual effect. The second visual effect is different from the first visual effect, and the second visual effect is a mirror effect. A boundary line between the second visual effect and the first visual effect is used to distinguish the first surface and the second surface.

9 Claims, 3 Drawing Sheets

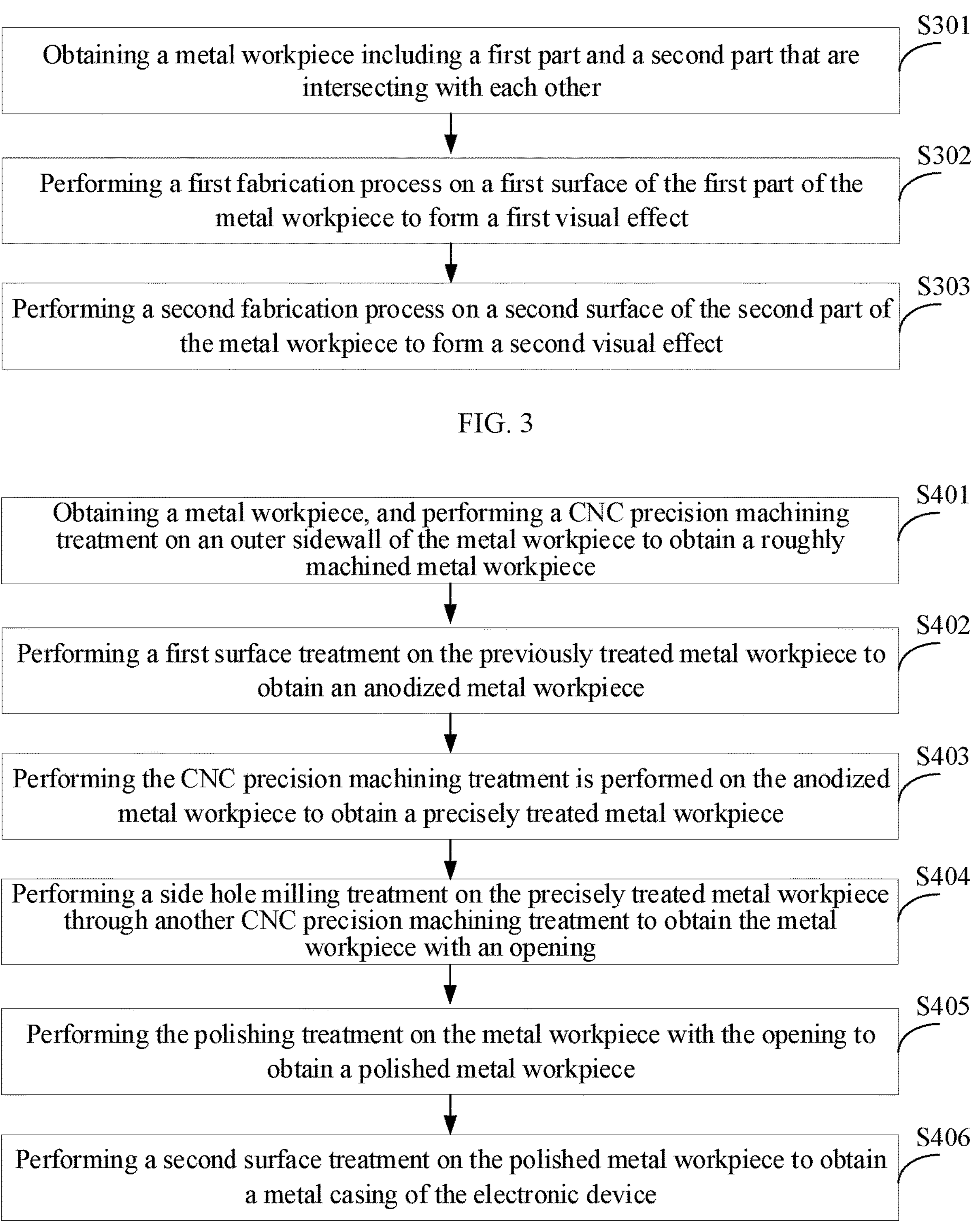
S301
Obtaining a metal workpiece including a first part and a second part that are intersecting with each other
S302
Performing a first fabrication process on a first surface of the first part of the metal workpiece to form a first visual effect
S303
Performing a second fabrication process on a second surface of the second part of the metal workpiece to form a second visual effect
FIG. 3
S401
Obtaining a metal workpiece, and performing a CNC precision machining treatment on an outer sidewall of the metal workpiece to obtain a roughly machined metal workpiece
S402
Performing a first surface treatment on the previously treated metal workpiece to obtain an anodized metal workpiece
S403
Performing the CNC precision machining treatment is performed on the anodized metal workpiece to obtain a precisely treated metal workpiece
S404
Performing a side hole milling treatment on the precisely treated metal workpiece through another CNC precision machining treatment to obtain the metal workpiece with an opening
S405
Performing the polishing treatment on the metal workpiece with the opening to obtain a polished metal workpiece
S406
Performing a second surface treatment on the polished metal workpiece to obtain a metal casing of the electronic device
FIG. 4

ELECTRONIC DEVICE AND FABRICATION METHOD THEREOF

CROSS-REFERENCE TO RELATED APPLICATION

This application claims priority to Chinese Patent Application No. 202210132943.4, filed on Feb. 14, 2022, the entire content of which is incorporated herein by reference.

TECHNICAL FIELD

The present disclosure relates to the technical field of terminal technologies and, more particularly, to an electronic device and a fabrication method thereof.

BACKGROUND

Currently, ultra-thin and light computers are favored by more and more high-end consumers. A shiny appearance becomes an indispensable feature of these electronic products. Related technologies use metallic materials to fabricate casings of the electronic devices. Metal texture may be used to improve an overall perception of quality of the electronic devices.

However, most processing of the metals in the related art is processing plane metal, and how to perform surface treatment on a metal casing with multiple intersecting surfaces has become an urgent problem that needs to be resolved.

SUMMARY

One aspect of the present disclosure provides an electronic device. The electronic device includes an integrally formed metal casing including a first part and a second part that are intersecting with each other. An outer surface of the first part is a first surface presenting a first visual effect. An outer surface of the second part is a second surface presenting a second visual effect. The second visual effect is different from the first visual effect, and the second visual effect is a mirror effect. A boundary line between the second visual effect and the first visual effect is used to distinguish the first surface and the second surface.

Another aspect of the present disclosure provides a fabrication method. The fabrication method includes obtaining a metal workpiece including a first part and a second part that are intersecting with each other; performing a first fabrication process on a first surface of the first part of the metal workpiece to form a first visual effect; and performing a second fabrication process on a second surface of the second part of the metal workpiece to form a second visual effect. The second visual effect is different from the first visual effect, and the second visual effect is a mirror effect. An outer surface of the first part is the first surface presenting the first visual effect. An outer surface of the second part is the second surface presenting the second visual effect. A boundary line between the second visual effect and the first visual effect is used to distinguish the first surface and the second surface.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

FIG. 3 is a flowchart of an exemplary method of fabricating an electronic device according to some embodiments of the present disclosure;

FIG. 4 is a flowchart of another exemplary method of fabricating an electronic device according to some embodiments of the present disclosure.

DETAILED DESCRIPTION OF THE EMBODIMENTS

Figure 1A:
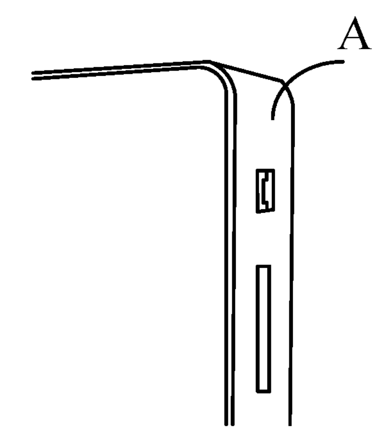
FIG. 1A is a schematic diagram showing an appearance of a middle frame of a mobile phone according to some embodiments of the present disclosure.

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure. In the specification and drawings, same or similar reference numerals refer to same or similar parts or components. For the sake of clarity, the drawings are not necessarily drawn to scale, and some well-known components and structures may be omitted from the drawings.

In some embodiments, unless otherwise defined, the technical terms or scientific terms used in the description of the embodiments of the present disclosure should have the usual meanings understood by those skilled in the art to which the embodiments of the present disclosure belong. "first\second" and similar words used in the embodiments of the present disclosure do not indicate any order, quantity or importance, but are only used to distinguish similar components. The words such as "a" or "an" do not exclude a plurality. The words such as "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element. The words such as "connected" or "connection" are not limited to physical or mechanical connections, but may include electrical connections, whether direct or indirect. The words "up", "down", "left", "right", "top" and "bottom" are only used to indicate relative positional relationship. When an absolute position of a described object changes, the relative positional relationship may also change accordingly. When an element such as a layer, film, region, or substrate is referred to as being "on" or "under" another element, it can be "directly on" or "directly under" the other element, or it can be "on" or "under" the other element with another intermediate element in-between.

Figure 1B:
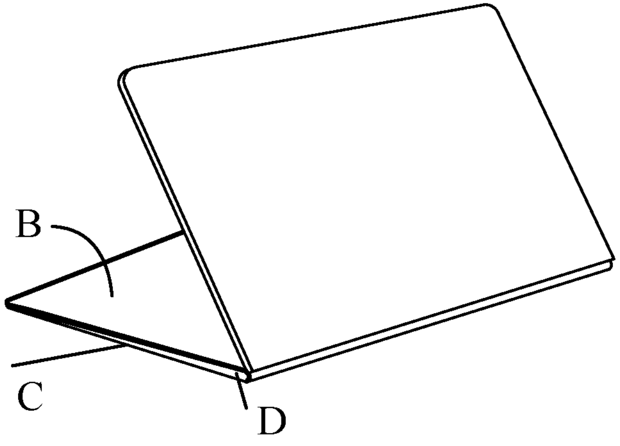
FIG. 1B is a schematic diagram showing an appearance of a notebook computer casing according to some embodiments of the present disclosure.

In the related art, a surface treatment of electronic devices may often be a surface treatment of a middle frame of a mobile phone. As shown in FIG. 1A, the surface A of the middle frame of the mobile phone is an outer surface of the middle frame, and does not include a plane perpendicular to the middle frame. Thus, when performing the surface treatment on the middle frame of the mobile phone, no damage may occur to other intersecting surfaces. However, when the electronic device is an electronic device such as a notebook computer, an outer casing of the notebook computer has a plurality of intersecting surfaces. As shown in FIG. 1B, the outer casing of the notebook computer includes a top surface B, a bottom surface C, and a side surface D intersecting with the top surface B and the bottom surface C. When the surface treatment method of the related art is used to treat the side surface D, damages to the top surface B and the bottom surface C are inevitable.

In the related art, when processing the outer casing with a plurality of intersecting surfaces, a process of treating the middle frame of the mobile phone may be used to treat the metal outer casing. After the metal outer casing is treated, the metal outer casing is directly subject to a rough polishing and a fine polishing. Problems such as a high temperature in the rough polishing may lead to product defects such as wavy edges, blurred border lines, and corner sags at the intersection of any two surfaces of the electronic device, thereby preventing the appearance of the products from meeting any quality requirements.

Figure 2:
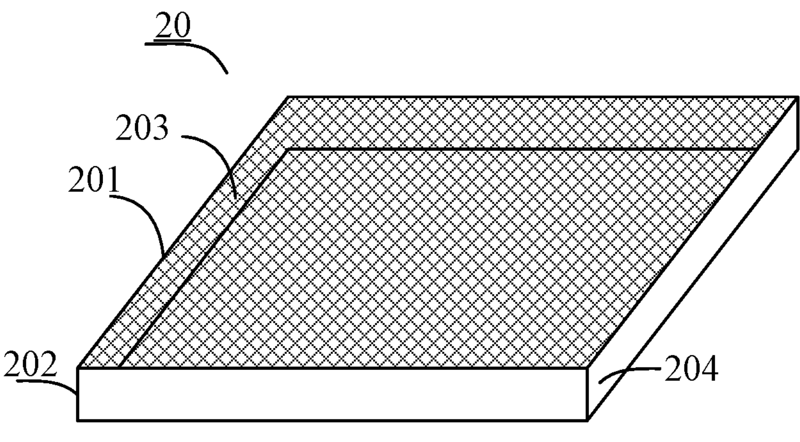
FIG. 2 is a schematic structural diagram of an exemplary electronic device according to some embodiments of the present disclosure.

To address the problems existed in the related art, the present disclosure provides a method of fabricating an electronic device. FIG. 2 is a schematic structural diagram of an exemplary electronic device according to some embodiments of the present disclosure. As shown in FIG. 2, the electronic device includes an integrally-formed metal casing 20. The metal casing 20 includes a first part 201 and a second mart 202 that intersect with each other. An outer surface of the first part 201 is a first surface 203 presenting a first visual effect. An outer surface of the second part 202 is a second surface 204 presenting a second visual effect.

In some embodiments, the second visual effect and the second visual effect are different. The second visual effect of the second surface 204 is a mirror effect. The first visual effect of the first surface 203 is a frosted effect, or an etched special pattern effect.

In some embodiments, a boundary line between the second visual effect and first visual effect is used to distinguish the first surface 203 from the second surface 204. The boundary line between the second visual effect and first visual effect is an intersection line between the first surface 203 and the second surface 204. In other words, the boundary line between the second visual effect and first visual effect coincides with the intersection line between the first surface 203 and the second surface 204.

In some embodiments, the first surface 203 of the metal casing may be a plane surface, and the second surface 204 of the metal casing may be an outer surface of a side frame of the metal casing that intersects with the first surface 203. The side frame may be a quadrangular frame, or an other-shaped frame. When the side frame is the quadrangular frame, the second surface 204 at each of the four corners of the side frame may be a curved surface. The second surface 204 of the outer surface of the side frame that is not located at the four corners may be a plane surface or a curved surface.

In some embodiments, the first part 201 of the metal casing 20 is a top surface of the metal casing 20 or a bottom surface of the metal casing 20. The second part 202 of the metal casing 20 is a side surface (or sidewall) of the metal casing.

In some embodiments, the first visual effect of the first part 201 of the metal casing 20 is formed on the first surface 203 of the metal casing 20 according to a first fabrication process, and the second visual effect of the second part 202 of the metal casing 20 is formed on the second surface 204 of the metal casing 20 according to a second fabrication process based on the first fabrication process.

In the electronic device provided by the embodiments of the present disclosure, the metal casing includes the first surface and the second surface that are intersecting with each other. The first surface presents the first visual effect. The second surface presents the second effect including the mirror effect. Multiple surfaces of various parts of the metal casing are treated to obtain desired appearances, such that the appearance of a portion of the metal casing presents a bright mirror effect, thereby making the metal casing appear more attractively. In the electronic device and the fabrication method thereof provided by the embodiments of the present disclosure, the intersection line between the first surface and the second surface of the metal casing is ensured to have a smooth appearance, thereby improving the quality at the intersection line, and improving the quality of the appearance of the electronic device.

Based on the above-described electronic device, the present disclosure provides a method of fabricating the electronic device. FIG. 3 is a flowchart of an exemplary method of fabricating an electronic device according to some embodiments of the present disclosure. As shown in FIG. 3, the method of fabricating the electronic device includes the following processes.

At S301, a metal workpiece including a first part and a second part that are intersecting with each other is obtained.

In some embodiments, the metal piece may be any kind of a plastic-like metal workpiece. Because the plastic-like metal workpiece has good plasticity, a shaping processing can be easily performed on the plastic-like metal workpiece. In this case, the metal workpiece may be made of aluminum, titanium, or magnesium. Thus, the metal casing of the electronic device provided by the embodiments of the present disclosure not only has the desired appearance but also is portable.

At S302, a first fabrication process is performed on a first surface of the first part of the metal workpiece to form a first visual effect.

In some embodiments, the first part may be a top part or a bottom part of the metal workpiece, and the second part may be a sidewall of the metal workpiece.

In some embodiments, the first fabrication process may include any one of the following surface protection treatments: an anodic oxidation treatment, a micro-arc oxidation treatment, a coating treatment, a spraying treatment, a high-pressure transfer treatment, or an electroplating film-forming treatment. After being treated by the first fabrication process, the metal workpiece has a functional protective film disposed on its surface. For example, the functional protective film may be a protective film of different colors, a waterproof functional protective film, an anti-static functional protective film, an anti-scratch functional protective film, a high hardness protective film, or a protective film with high brightness or frosted effects. After being treated for the surface protection treatment to form the functional protective film, the metal workpiece not only is enhanced with the above functions, but also is provided with a more attractive appearance.

In some embodiments, the protective film disposed on the first surface of the first part of the metal workpiece protects the outer surface of the first part of the metal workpiece from being damaged in subsequent processing, or unnecessary scratches on the outer surface of the first part, thereby avoiding unnecessary process steps.

At S303, a second fabrication process is formed on a second surface of the second part of the metal workpiece to form a second visual effect.

In some embodiments, the first surface presenting the first visual effect and the second surface presenting the second visual effect are formed after the outer surface of the second part of the metal workpiece is treated by the second fabrication process. The first visual effect and the second visual effect are different. The second visual effect is the mirror effect. The outer surface of the first part is the first surface presenting the first visual effect. The outer surface of the second part is the second surface presenting the second visual effect. The boundary line between the second visual effect and the first visual effect is sued to distinguish the first surface from the second surface.

In some embodiments, the second fabrication process is only for the outer surface of the second part of the metal workpiece. That is, the second fabrication process is only for the sidewall surface of the metal workpiece. After the second fabrication process is performed on the sidewall surface of the metal workpiece, the outer surface of the second part forms the second visual effect, and the outer surface of the first part forms the first visual effect.

In some embodiments, after the metal workpiece is treated by the first fabrication process, the protective film is formed on the surface of the metal workpiece. Thus, when the outer surface of the second part is treated by the second fabrication process, no damage may occur to the outer surface of the first part. In some embodiments, to effectively protect the outer surface of the first part, a jig protection treatment or an isolation film treatment may be performed on the outer surface of the first part.

In some embodiments, the second fabrication process at least includes: performing a computerized numerical control (CNC) precision machining treatment on the outer surface of the second part to remove a protective layer thereon formed by the anodic oxidation treatment in the first fabrication process (S3021).

In some embodiments, the CNC precision machining treatment may include: sequentially processing the outer surface of the second part with different high-gloss milling cutters. For example, a first high-gloss milling treatment, a second high-gloss milling treatment, and a third high-gloss milling treatment may be performed on the outer surface of the second part to remove the protective layer on the outer surface of the second part and cutting patterns formed on the outer surface of the second part when the metal workpiece is formed.

In some embodiments, the high-gloss milling treatment may be milling the outer surface of the second portion using a high-gloss milling cutter. In some embodiments, processing accuracies of the first high-gloss milling treatment, the second high-gloss milling treatment, and the third high-gloss milling treatment increase sequentially. For example, the processing accuracy of the high-gloss milling cutter in the first high-gloss milling treatment is 0.15 mm, that is, a 0.15 mm depth of a metal material is removed from the outer surface of the second part. The processing accuracy of the high-gloss milling cutter in the second high-gloss milling treatment is 0.1 mm, that is, after the first high-gloss milling treatment, another 0.1 mm depth of the metal material is removed from the outer surface of the second part. The processing accuracy of the high-gloss milling cutter in the third high-gloss milling treatment is 0.05 mm, that is, after the second high-gloss milling treatment, another 0.05 mm depth of the metal material is removed from the outer surface of the second part. After the first high-gloss milling treatment, the second high-gloss milling treatment and the third high-gloss milling treatment on the outer surface of the second part are performed sequentially, the protective layer formed by the anodic oxidation treatment in the first fabrication process is removed from the outer surface of the second part.

In some embodiments, when the high-gloss milling cutter is used to mill the outer surface of the second part, a cooling liquid is configured such that when the protective layer on the outer surface of the second part is removed, a high temperature may not be generated to deform a junction between the first part and the second part of the metal workpiece, and the protective film formed in the first fabrication process on the outer surface of the first part of the metal workpiece may not be damaged. Moreover, in the embodiments of the present disclosure, the three high-gloss milling treatments are performed sequentially with gradually increased processing accuracies. Compared with the one-time high-gloss milling treatment, which directly removes the metal material at a predetermined depth, the fabrication process provided by the embodiments of the present disclosure removes the protective layer on the outer surface of the second part with a more precise thickness, thereby avoiding errors.

In the embodiments of the present disclosure, the protective layer is removed through the three high-gloss milling treatments. After the three high-gloss milling treatments, the cutting patterns occurred when an integral metal workpiece is formed may be removed, and deep cutting patterns occurred when the protective layer is directly removed by rough polishing may be avoided. Otherwise, it is difficult to remove the deep cutting patterns in subsequent processes.

In some embodiments, a pattern design can be carried out in CNC, such that the outer surface of the second part has a pattern preset by the technician, for example, a brand logo and the like after the CNC precision machining treatment is performed on the outer surface.

At S3022, a polishing treatment is performed on the outer surface of the second part, after the CNC precision machining treatment, to form the mirror effect.

In some embodiments, the polishing treatment at least includes sequentially performing a first polishing treatment and a second polishing treatment on the outer surface of the second part having the cutting patterns, to form the mirror effect on the outer surface of the second part.

In some embodiments, the processing accuracy of the first polishing treatment is greater than the processing accuracy of the second polishing treatment. In some embodiments, the processing accuracy of the polishing treatment refers to an abrasive grain size during polishing, and the abrasive grain size of the second polishing treatment is smaller than that of the first polishing treatment.

In some embodiments, the first polishing treatment may be a blue wax polishing for about 70 to 80 seconds, and the second polishing treatment may be a white wax polishing for about 70 to 80 seconds.

In some embodiments, shallow cutting patterns formed after the CNC treatment may be removed by the first polishing treatment, but wear marks may occur. The second polishing treatment removes the wear marks and forms the mirror effect on the outer surface of the second part.

In some embodiments, when the CNC precision machining treatment and the polishing treatment are performed on the second surface, it is necessary to perform the treatments according to a desired appearance of the outer surface of the second part of the metal workpiece. The outer surface of the second part is the outer surface of the side frame of the metal workpiece that intersects with the outer surface of the first part. The metal side frame may be a quadrilateral frame or a frame of other shapes. When the side frame of the metal workpiece is the quadrilateral frame, the second surfaces at the four corners of the side frame may be curved surfaces, and the second surface that is not located at the four corners of the side frame may be a plane surface or an arc surface. Thus, when the CNC precision machining treatment and the polishing treatment are performed on the metal workpiece, it is necessary to process the four corners of the side frame of the metal workpiece into the curved surfaces, such that the outer surfaces at the four corners of the second part of the metal workpiece are the curved surfaces with a mirror visual effect, and the outer surface that is not located at the four corners of the second part of the metal workpiece is the plane surface or the arc surface with the mirror visual effect.

In some embodiments, a processing duration of the CNC precision machining treatment is proportional to a polishing duration of the polishing treatment, and within the processing duration and the polishing duration, the CNC precision machining treatment and the polishing treatment are not performed on the protective layer of the outer surface of the first part, such that the polishing treatment can completely remove the remaining shallow cutting patterns on the outer surface of the second part to obtain the mirror effect on the outer surface of the second part without damaging the protective layer on the first surface.

In some embodiments, the polishing duration of the polishing treatment may also be proportional to the size of the metal workpiece. The larger the metal workpiece, the longer the polishing duration.

In some embodiments, before the CNC precision machining treatment or the polishing treatment is performed on the metal workpiece, the metal workpiece is first cleaned to remove metal residues remaining from a previous process. For example, a degreasing cleaning agent such as a sodium phosphate solution, a sodium carbonate solution, or a sodium pyrophosphate solution may be used to degrease the metal workpiece to remove metal residues, oil stains remaining during processing, or residues such as grinding and polishing fluids, from the surface of the metal workpiece.

In some embodiments, before the metal workpiece is obtained, the metal workpiece is subjected to a plastic processing to form the metal workpiece with a predetermined size and a predetermined shape on the outer surface. For example, if the metal workpiece is for making a notebook computer, the predetermined size and the predetermined shape are a size and a shape of the outer casing of the notebook computer designed by a technician.

In some embodiments, before the CNC precision machining treatment and the polishing treatment are performed, an opening may be formed at a position predetermined by the technician on the second part of the workpiece. The opening is used for providing a functional connection port after the metal workpiece is made into the electronic device. For example, the opening may be made into a universal serial bus (USB) interface, a network interface, and other interfaces of the electronic device in a later stage.

In some embodiments, after the first fabrication treatment and the second fabrication treatment are performed, the second surface of the metal workpiece that intersects with the first surface presents the mirror effect, and the first surface presents the first visual effect. Thus, the fabrication method provided by the embodiments of the present disclosure is able to perform an appearance treatment on a portion of a plurality of surfaces of the metal casing, such that the metal casing can have a more appealing and attractive appearance.

Further, the present disclosure provides a fabrication method. FIG. 4 is a flowchart of another exemplary method of fabricating an electronic device according to some embodiments of the present disclosure. As shown in FIG. 4, the fabrication method includes the following processes.

At S401, a metal workpiece is obtained, and a CNC precision machining treatment is performed on an outer sidewall of the metal workpiece to obtain a roughly machined metal workpiece.

In this case, the obtained metal workpiece may be a metal workpiece that has a predetermined size and a predetermined shape of the electronic device. The CNC precision machining treatment performed on the metal workpiece roughly removes unevenness at various positions of the outer surface of the metal workpiece to flatten the outer surface of the metal workpiece.

In some embodiments, the predetermined size and the predetermined shape of the metal casing are predetermined by a designer. Size parameters of the metal casing are known.

At S402, a first surface treatment is performed on the previously treated metal workpiece to obtain an anodized metal workpiece.

In some embodiments, the first surface treatment may be a surface treatment such as an anodic oxidation treatment, a micro-arc oxidation treatment, a film coating treatment, a spray coating treatment, a high-pressure transfer printing treatment, or an electroplating film forming treatment. After the first surface treatment, the metal workpiece has a functional protective film on its surface. For example, a protective film of different colors, a waterproof functional protective film, an anti-static functional protective film, an anti-scratch functional protective film, a high hardness protective film, a protective film with high brightness or frosted effect, etc. may be formed on the surface of the metal workpiece. The metal workpiece with the functional protective film formed through the first surface treatment has the above functions and is more attractive in appearance.

In some embodiments, the first surface treatment is performed on the entire outer surface of the metal workpiece, such that the entire outer surface (i.e., the first surface and the second surface) of the metal workpiece is covered with the protective film.

In some embodiments, the protective film on the first surface of the first part of the metal workpiece protects the first surface from being damaged in subsequent processing, such that unnecessary scratches and unnecessary process steps are avoided.

At S403, the CNC precision machining treatment is performed on the anodized metal workpiece to obtain a precisely treated metal workpiece.

In some embodiments, after the protective film is formed, a visual effect treatment is performed on the sidewall of the metal workpiece (i.e., the second surface). For example, the visual effect treatment such as the CNC precision machining treatment, side hole milling, and the polishing treatment makes the sidewall of the metal workpiece present different visual effects.

In this case, the CNC precision machining treatment can be high-gloss milling. In some embodiments, the CNC precision machining treatment can be divided into three steps, which are a high-gloss rough milling treatment, a high-gloss intermediate milling treatment, and a high-gloss fine milling treatment, respectively. The processing accuracy in each of the three treatments gradually increases from rough milling to fine milling. For example, the processing accuracy of the high-gloss milling cutter in the high-gloss rough milling treatment is 0.15 mm, that is, the 0.15 mm depth of the metal material is removed from the sidewall of the metal workpiece after the high-gloss rough milling treatment is performed. The processing accuracy of the high-gloss milling cutter in the high-gloss intermediate milling treatment is 0.10 mm, that is, the 0.10 mm depth of the metal material is removed from the sidewall of the metal workpiece after the high-gloss intermediate milling treatment is performed. The processing accuracy of the high-gloss milling cutter in the high-gloss fine milling treatment is 0.05 mm, that is, the 0.05 mm depth of the metal material is removed from the sidewall of the metal workpiece after the high-gloss fine milling treatment is performed. After all three steps of the CNC precision machining treatment are performed, the side surface (i.e., the second surface) of the metal workpiece has relatively shallow cutting patterns.

At S404, a side hole milling treatment is performed on the precisely treated metal workpiece through another CNC precision machining treatment to obtain the metal workpiece with an opening.

In some embodiments, milling a side hole refers to forming an opening on the sidewall of the metal workpiece.

At S405, the polishing treatment is performed on the metal workpiece with the opening to obtain a polished metal workpiece.

In some embodiments, the polishing treatment includes two steps of an intermediate polishing treatment and a fine polishing treatment. The intermediate polishing treatment is performed with a blue wax for about 70 to 80 seconds, and the fine polishing treatment is performed with a white wax for about 70 to 80 seconds. After the polishing treatment is performed, the shallow cutting patterns are removed from the sidewall of the metal workpiece (i.e., the second surface) to have the mirror effect.

At S406, a second surface treatment is performed on the polished metal workpiece to obtain a metal casing of the electronic device.

In this case, the second surface treatment and the first surface treatment may be the same or different. The second surface treatment may form the protective layer on the metal workpiece with the mirror effect, such that the surface of the metal workpiece is not easy to be scratched, and the high-gloss mirror effect can be well maintained.

In some embodiments, the second surface treatment may be performed on the sidewall (i.e., the second surface presenting the mirror effect) of the metal workpiece or on the entire surface of the metal workpiece, which is not limited by the present disclosure.

In some embodiments, the first surface of the metal casing after the second surface treatment has a protective film. The first surface has the first visual effect, and the second surface intersecting the first surface presents the second visual effect of the mirror effect. Because the first surface and the second surface have different visual effects, a visual effect boundary line exists between the first visual effect and the second visual effect, and the visual effects on both sides of the boundary line are different. Thus, the visual effect boundary line may be used to distinguish the first surface and the second surface of the metal casing.

In some embodiments, three high-gloss milling cutters are used to replace the rough polishing process of the metal workpiece, which avoids the formation of obvious cutting patterns on the surface of the metal workpiece, and also avoids the deformation of the metal workpiece due to the high temperature caused by rough polishing process, thereby improving production yield.

Figure 5:
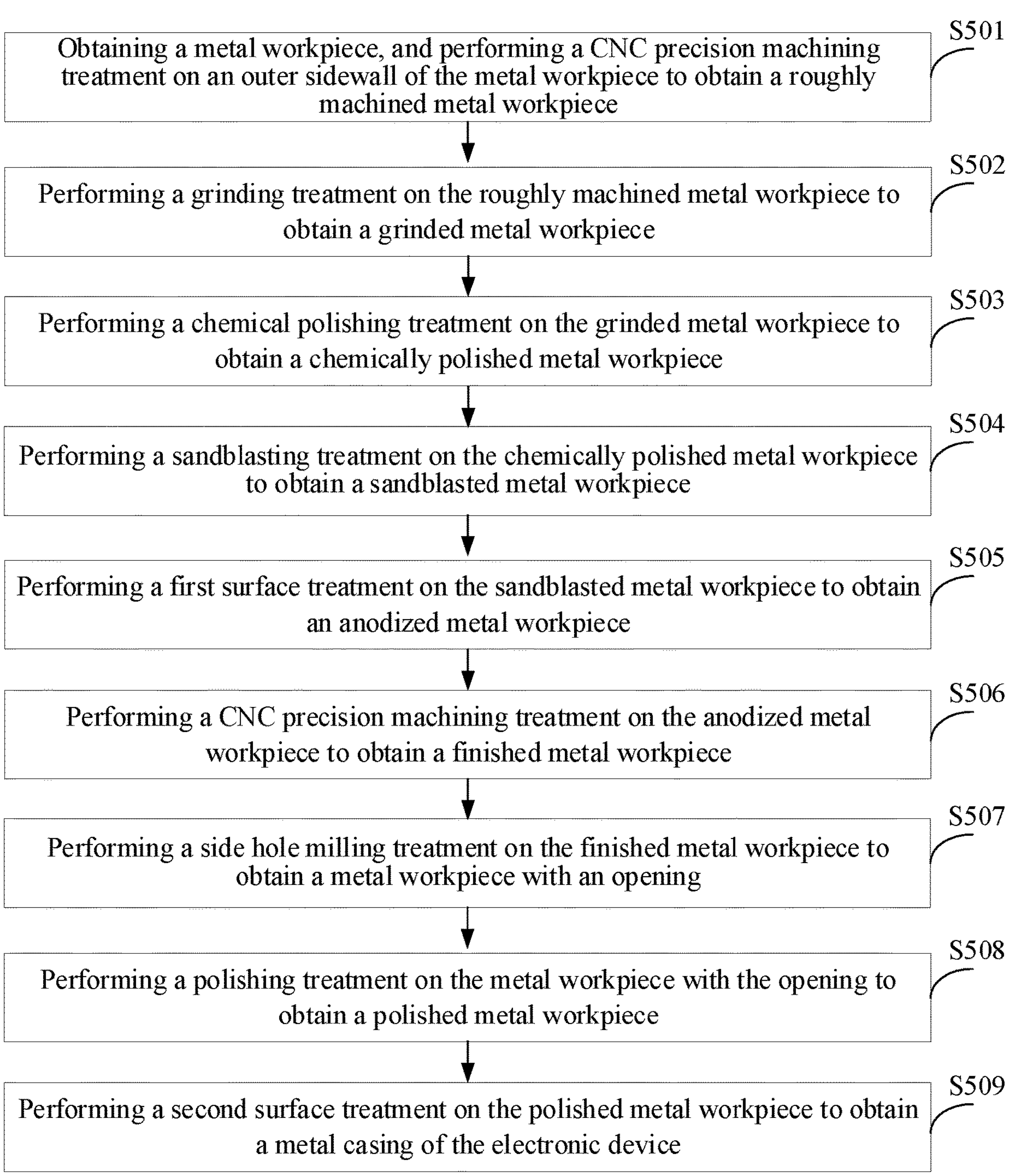
FIG. 5 is a flowchart of another exemplary method of fabricating an electronic device according to some embodiments of the present disclosure.

Based on the above-described embodiments, the present disclosure provides another fabrication method. FIG. 5 is a flowchart of another exemplary method of fabricating an electronic device according to some embodiments of the present disclosure. As shown in FIG. 5, the fabrication method includes the following processes.

At S501, a metal workpiece is obtained, and a CNC precision machining treatment is performed on the metal workpiece to obtain a roughly machined metal workpiece.

At S502, a grinding treatment is performed on the roughly machined metal workpiece to obtain a grinded metal workpiece.

In some embodiments, the grinding treatment on the roughly machined metal workpiece refers to grinding traces left on the surface of the roughly machined metal workpiece, for example, grinding away some debris that have not been cut off.

At S503, a chemical polishing treatment is performed on the grinded metal workpiece to obtain a chemically polished metal workpiece.

In some embodiments, the chemical polishing treatment refers to dissolving uneven areas on the surface of the metal workpiece with a chemical agent to obtain a smooth surface of the metal workpiece. In some embodiments, the chemical agent may be a mixture of a phosphoric acid and a concentrated sulfuric acid.

At S504, a sandblasting treatment is performed on the chemically polished metal workpiece to obtain a sandblasted metal workpiece.

In some embodiments, the sandblasting treatment refers to cleaning the surface of the metal workpiece by the impact of high-speed sand flow, and no foreign matter exists on the surface of the metal workpiece after the sandblasting treatment is performed.

At S505, a first surface treatment is performed on the sandblasted metal workpiece to obtain an anodized metal workpiece.

In some embodiments, the first surface treatment is performed on the entire metal workpiece, and the outer surface (i.e., the first surface and the second surface) of the entire metal workpiece is covered with a protective film at one time.

At S506, a CNC precision machining treatment is performed on the anodized metal workpiece to obtain a finished metal workpiece.

At S507, a side hole milling treatment is performed on the finished metal workpiece to obtain a metal workpiece with an opening.

At S508, a polishing treatment is performed on the metal workpiece with the opening to obtain a polished metal workpiece.

At S509, a second surface treatment is performed on the polished metal workpiece to obtain a metal casing of the electronic device.

In some embodiments, the second surface treatment may only be performed on the side of the metal workpiece (i.e., the second surface with the mirror effect), or may be performed on the entire surface of the metal workpiece, which is not limited by the present disclosure.

In some embodiments, the first surface of the metal cashing after the second surface treatment has the protective film and presents the first visual effect, and the second surface intersecting with the first surface presents the second visual effect with the mirror effect. Because the first surface and the second surface have different visual effects, the visual effect boundary line exists between the first visual effect and the second visual effect, and the visual effects on both sides of the boundary line are different. Thus, the boundary line can be used to distinguish the first surface and the second surface of the metal housing.

In some embodiments, S505 to S509 are the same as S402 to S406 in the above-described embodiments, and the description thereof is omitted.

In the embodiments of the present disclosure, before finishing and polishing the side of the metal workpiece, the first surface treatment is performed to form the protective film, and the protective film protects the surface of the metal workpiece that does not require high-gloss visual effects. The fabrication method provided by the embodiments of the present disclosure performs the appearance treatment on part of the surface of the metal casing with multiple surfaces. The appearance of the part of the metal cashing presents a bright mirror effect, which is more attractive in appearance. The electronic device and the fabrication method provided by the embodiments of the present disclosure ensure the smoothness of the boundary line between the first surface and the second surface of the metal casing, improve the quality of the junction, make the appearance of the metal casing more beautiful, and improve the quality of the appearance of the electronic device.

It should be noted that the technical features in the technical solutions described in the embodiments of the present disclosure may be combined arbitrarily on the condition of no conflict.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not refer to an execution order. The execution order of the processes should be determined by their functions and internal logic, and should not be used to limit the embodiments of the present disclosure. The sequence numbers in the embodiments of the present disclosure are intended for description only, and do not represent the advantages and disadvantages of the embodiments.

It should be noted that, in the specification, the terms "comprising", "including" or any other variation thereof are intended to cover a non-exclusive inclusion such that a process, method or apparatus comprising a series of elements includes not only those elements, but also other elements not expressly listed or elements inherent in such process, method, or apparatus. Without further limitations, an element defined by the phrase "comprising a . . . " does not preclude the presence of additional identical elements in the process, method, article, or apparatus comprising that element. In the embodiments of the present disclosure, it should be understood that the disclosed devices and methods may be implemented in other ways. The device embodiments described above are only illustrative. For example, division of units is only a logical function division. In actual implementation, there may be other division methods. For example, multiple units or components may be combined or may be integrated into another system. Some features may be ignored or may not be implemented.

The above is only the embodiment of the present application, but the scope of protection of the present application is not limited thereto. The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, the disclosure will not be limited to the embodiments shown in the specification, but should conform to the broadest scope consistent with the principles and novelties disclosed in the specification. The protection scope of the present application should be determined by the protection scope of the claims.

What is claimed is:

1. An electronic device, comprising:

a metal casing including a first part and a second part intersecting with the first part, the metal casing being made of titanium or magnesium;

wherein:

an outer surface of the first part is a first surface presenting a first visual effect;

an outer surface of the second part is a second surface presenting a second visual effect;

the second visual effect is different from the first visual effect, the first visual effect is an effect of a protective film of a different color formed on the first surface, and the second visual effect is a mirror effect formed by metal polishing; and a boundary line between the second visual effect and the first visual effect is used to distinguish the first surface and the second surface.

2. The electronic device according to claim 1, wherein:

the boundary line between the second visual effect and the first visual effect coincides with an intersection line between the first surface and the second surface.

3. The electronic device according to claim 1, wherein:

the first surface is a plane surface and the second surface is a curved surface.

4. The electronic device according to claim 1, wherein:

the first part is a top part of the metal casing or a bottom part of the metal casing; and the second part is a sidewall of the metal casing.

5. The electronic device according to claim 1, wherein:

a first fabrication process is performed on the first surface of the first part of the metal casing to form the first visual effect; and a second fabrication process is performed on the second surface of the second part of the metal casing to form the second visual effect.

6. A fabrication method, comprising:

obtaining a metal workpiece including a first part and a second part intersecting with the first part;

performing a first fabrication process on a first surface of the first part of the metal workpiece to form a first visual effect; and performing a second fabrication process on a second surface of the second part of the metal workpiece to form a second visual effect;

wherein:

the second visual effect is different from the first visual effect, and the second visual effect is a mirror effect;

an outer surface of the first part is the first surface presenting the first visual effect;

an outer surface of the second part is the second surface presenting the second visual effect;

a boundary line between the second visual effect and the first visual effect is used to distinguish the first surface and the second surface; and the second fabrication process at least comprises:

performing a computer numerical control (CNC) precision machining treatment on the outer surface of the second part to remove a protective layer formed on the outer surface of the second part by an anodic oxidation treatment in the first fabrication process; and performing a polishing treatment on the outer surface of the second part after the CNC precision machining treatment to form the mirror effect.

7. The fabrication method according to claim 6, wherein:

a processing duration of the CNC precision machining treatment is proportional to a polishing duration of the polishing treatment; and within the processing duration and the polishing duration, the CNC precision machining treatment and the polishing treatment are not performed on the protective layer on the outer surface of the first part.

8. The fabrication method according to claim 6, wherein:

the CNC precision machining treatment at least includes using different high-gloss cutters to perform the CNC precision machining treatment on the outer surface of the second part to remove the protective layer from the outer surface of the second part; and the polishing treatment at least includes performing a first polishing treatment and a second polishing treatment on the outer surface of the second part after the CNC precision machining treatment to form the mirror effect on the outer surface of the second part;

wherein a processing accuracy of the first polishing treatment is greater than a processing accuracy of the second polishing treatment.

9. The fabrication method according to claim 6, after the first fabrication process is performed, further comprising:

performing a jig protection treatment or an isolation film treatment on the outer surface of the first part.

* * * * *